United States Patent [19]
Kerr

[11] 4,151,468
[45] Apr. 24, 1979

[54] MICROPHONE HOLDER ATTACHMENT AND SWITCH CONTROL THEREFOR

[76] Inventor: Leslie I. Kerr, 16 Polk Rd., Hingham, Mass. 02043

[21] Appl. No.: 827,473

[22] Filed: Aug. 25, 1977

[51] Int. Cl.² ............................................. H04B 1/38
[52] U.S. Cl. ..................................... 325/15; 325/314; 179/148 F
[58] Field of Search ...................... 325/15, 16, 22, 312, 325/390, 314; 179/146, 147, 148 F

[56] References Cited
U.S. PATENT DOCUMENTS

| | | | |
|---|---|---|---|
| 1,926,256 | 9/1933 | Barrett | 325/314 |
| 2,010,566 | 8/1935 | Schuety | 179/147 |
| 2,520,732 | 8/1950 | McDonald | 325/390 |
| 3,723,876 | 3/1973 | Seaborn, Jr. | 325/16 |
| 3,757,363 | 9/1973 | Langlais | 179/146 R |
| 3,868,571 | 2/1975 | Greiner | 325/15 |

Primary Examiner—Robert L. Griffin
Assistant Examiner—Tommy P. Chin
Attorney, Agent, or Firm—Munroe H. Hamilton

[57] ABSTRACT

A microphone holder frame is mechanically supported in a raised position to enable the driver of a motor vehicle to transmit messages through a Citizens Band transceiver without use of the hands. The frame is supported on an adjustable bracket structure engageable with the seat of a motor vehicle. A foot pedal designed to be fastened to the floor of the vehicle operates a switch actuating slide member which can be engaged against the control switch of the microphone enabling a driver to maintain both hands on the wheel of a motor vehicle when speaking into the microphone. The arrangement of parts is designed to avoid violation of possible traffic regulations prohibiting the use of one hand to hold a microphone while driving with one hand only.

7 Claims, 8 Drawing Figures

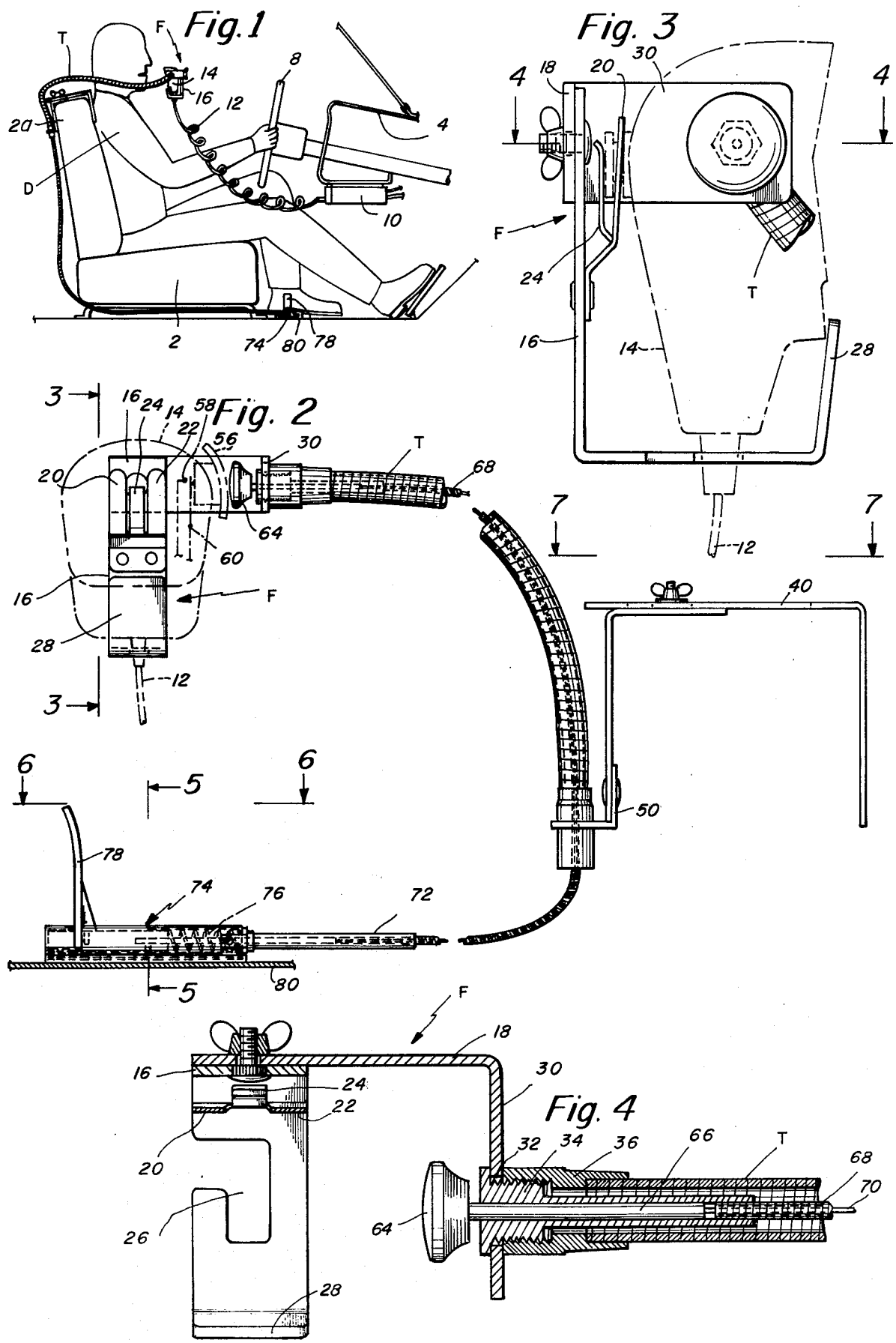

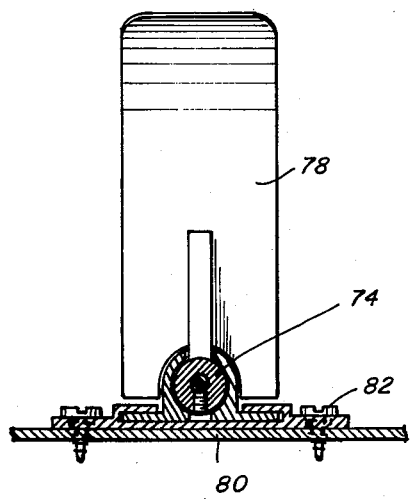
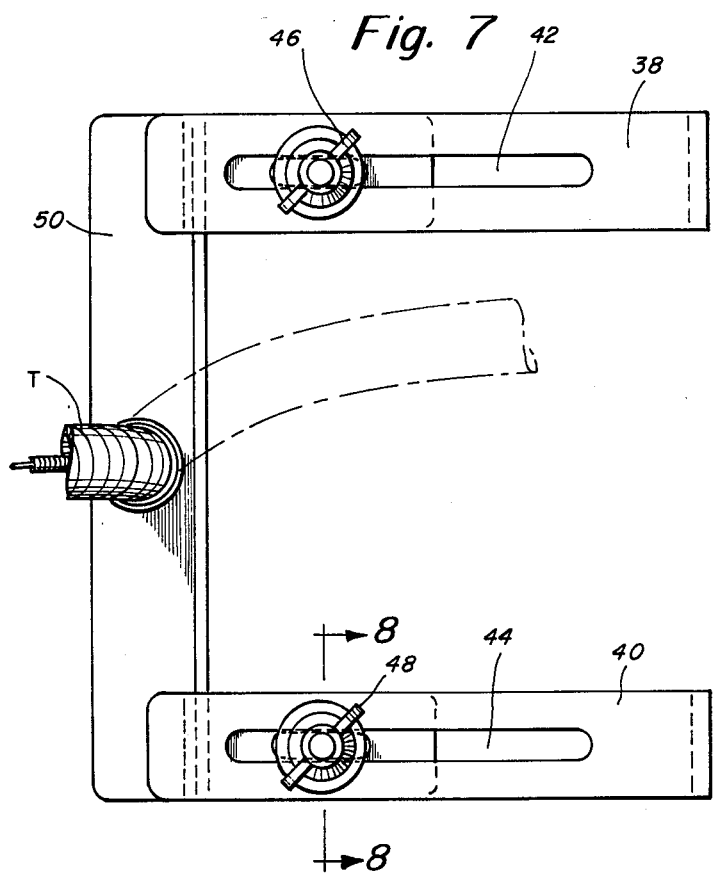
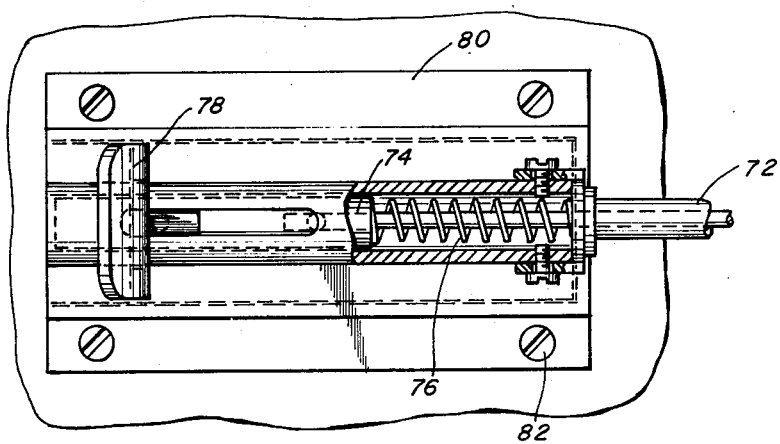
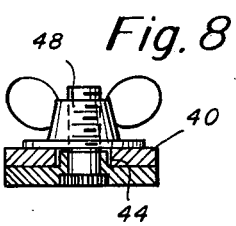

MICROPHONE HOLDER ATTACHMENT AND SWITCH CONTROL THEREFOR

BACKGROUND OF THE INVENTION

Citizens Band transmitting and receiving units, commonly referred to as transceivers, are presently being installed in motor vehicles in increasing volume and it is customary for the driver of the vehicle to drive a moving vehicle with one hand on the wheel while the other hand is used to hold a microphone as messages are being transmitted by the driver. It is understood that there has been objection to this practice when continuously carried out by some traffic officers as it is claimed that in the event of a sudden traffic emergency, failure to have both hands available for driving may lead to difficulty.

Various proposals have been made for mounting Citizen Band units in vehicles and it is wellknown in the art to provide remote control devices for radio receiving appartus as well as portable units to be carried by an operator. Proposals of this nature are, for example, noted in U.S. Pat. Nos. 1,926,256, 2,520,732, 2,436,177, 3,745,462 and 3,914,629. More recently, there has been disclosed in U.S. Pat. No. 3,944,924 a Citizens Band transceiver assembly for mounting a transceiver on the body of a motorcycle. In all of these proposed arrangements, it is understood that manual control is required.

SUMMARY OF THE INVENTION

The present invention relates to a Citizens Band transceiver and microphone assembly and in particular is concerned with an attachment for a Citzens Band microphone by means of which the microphone may be mechanically supported in a raised position in a speaking mode in front of the driver of a motor vehicle. Combined with the supporting means is a switch actuating apparatus which is designed to be operated by the foot of a vehicle driver so that messages may be transmitted with the driver enabled to keep both hands on the wheel or available for use if necessary. In general, the attachment comprises a microphone holder frame, support means for securing the holder frame in a raised position in front of a vehicle driver, and foot pedal means operative through the frame for actuating the control switch of the microphone when a message is to be sent.

BRIEF DESCRIPTION OF THE DRAWINGS

FIG. 1 is a side elevational view illustrating diagramatically a motor vehicle seat and the driver thereon with a Citizens Band transceiver mounted in the vehicle and a microphone component supported in an operating position.

FIG. 2 is another side elevational view showing the components of the attachment on a larger scale and removed from the motor vehicle.

FIG. 3 is an elevational view taken approximately along the line 3—3 of FIG. 2.

FIG. 4 is a cross sectional view taken on the line of 4—4 of FIG. 3.

FIG. 5 is a cross sectional view taken on the line 5—5 if FIG. 2.

FIG. 6 is a plan view taken along the line 6—6 of FIG. 2.

FIG. 7 is a view taken along the line 7—7 of FIG. 2.

FIG. 8 is a cross section taken on the line 8—8 of FIG. 7.

DETAILED DESCRIPTION OF THE INVENTION

Referring in detail to the drawings, FIG. 1 illustrates diagrammatically a seat 2 which may, for example, be a seat of a motor vehicle, a front portion of which is fragmentarily indicated by numeral 4. Numeral 6 indicates diagrammatically a motor vehicle Driver sitting in a typical driving position on the seat 2 so that a steering wheel 8 may be grasped by both hands of the driver when desired.

A Citizens Band transceiver of conventional nature is denoted by the numeral 10 and may be mounted in any convention point on the vehicle body, for example, at the underside of the front panel 4. The transceiver unit 10 includes a microphone 14 which is normally mounted on the transceiver body 10 by means of a standard clip arrangement. The microphone is electrically connected to the transceiver by electrical conductor means 12.

In accordance with the invention, there is provided attachment means by which the microphone 14 may be removed from the transceiver 10 and mechanically supported in a position in front of the vehicle Driver in a speaking mode as has been suggested in FIG. 1. An important component of the attachment means is a microphone holder frame generally denoted by the arrow F. As is more clearly shown in FIGS. 2-4, inclusive, the holder frame F is comprised by a U-shaped frame part 16 which is normally designed to be located in a vertically disposed position as suggested in FIG. 3. A second frame part 18 is adjustably secured at an upper end of the frame part 16 by means such as a wing nut and is normally located in a horizontally extending position as is shown in FIG. 3.

Secured to an inner side of the U-shaped frame part 16 by suitable fastening means is a clip device having spaced apart upright fingers 20 and 22 and an offset spring tongue 24 arranged in spaced relation between the fingers 20 and 22. This clip arrangement is intended to be engageable with the back of conventional microphones used in Citizens Band transceivers in the usual manner to thus secure the microphone in the frame in a tightly held manner.

At the lower extremity of the frame 16, there is formed a cord retaining slot 26 in which the electrical conductor 12 may be releasably contained. FIG. 3 illustrates the microphone 14 mounted in the frame as described with the conductor means extending downwardly through the cord retaining slot 26 and with a lower edge of the microphone 14 being snugly received against an upright extension 28 of the frame 16.

The second horizontally disposed frame part 18 is, as shown in FIGS. 3 and 4, formed with an angularly disposed part 30. Support means for locating the microphone holder frame in the speaking mode described is solidly secured to the angular extension 30. As one suitable form of support means, there is provided a tubular body T which may, for example, consist of a spirally wound metal capable of providing a substantial degree of rigidity and yet being sufficiently flexible to be turned into any desired position of adjustment. One desirable means of attaching the tubular body T to extension part 30 may include cylindrical adapter 34 having a threaded outer portion received through a hole 32 in the extension part 30. In threaded engagement with the holder 34 is a cylindrical locking sleeve 36 within which is tightly fitted one end of the tubular body T as is most clearly shown in FIG. 4.

At its opposite end, the tubular body T is firmly anchored in an adjustable bracket structure which, as shown in FIG. 1, may in one preferred form include a pair of spaced apart U-shaped retainer arms 38 and 40. These retainer arms, as shown in FIG. 1, may be fitted over back 2a of the seat 2. Adjustment for varying widths of seat backs may be accomplished by means of slots 42 and 44 in which are located wing nuts 46 and 48.

The retainer arms 38 and 40 have their lower extremities bolted or otherwise fastened to a crossbar 50 in which the end of tubular member T is centrally secured. With the retainer arms engaged as described, it will be seen that the tubular member T can be adjusted to support the microphone frame as desired in a convenient speaking mode in front of the Driver D. Further combined with the microphone frame for support means now described is means for actuating the control switch of the microphone. This control switch is of conventional form and is indicated diagrammatically together with the electrical contacts in FIG. 2 in broken lines. Numeral 56 denotes an external switch element which can be moved inwardly to close the electrical contacts 58 and 60 which places the microphone in an operative position.

The switch actuating means includes an actuator knob 64 which, as shown in FIGS. 2, 3 and 4, is mounted in the frame part 30 in a position closely adjacent to the switch element 56. FIG. 2 indicates the close proximity of these parts to one another. Forming a part of knob 64 is a spindle part 66 which extends through the threaded holder 34 to connect with one end of an actuator element 68 through a rod part 70. The actuator element 68 extends all the way through the tubular member T as shown in FIG. 2 and projects outwardly therefrom for an appreciable distance to connect with a slide element 72 of a foot pedal device generally indicated at 74. A spring 76 normally holds the actuator element and slide in a retracted position. Included in the foot pedal device is an upright lug position 78 which, as shown in FIG. 1, is designed to be contacted by a foot of the Driver D and forced forwardly to advance the switch actuator button 64 against the control switch element 56. This enables the Driver D to then speak into the microphone as long as desired and when message transmission is terminated foot pressure is released and the actuating element is retracted with the control switch being opened. The foot pedal device is provided with a base plate 80 which can be secured by fastenings as screws 82 to the floor of the vehicle at any convenient point for engagement by the Driver's foot.

I claim:

1. Apparatus for supporting a Citzens Band transceiver microphone together with an externally located control switch in a position to be operated by the driver of a motor vehicle, said apparatus including a microphone holder frame in which the microphone may be detachably secured to present the control switch in an exposed position at one side thereof, means for adjustably locating the holder frame and microphone in front of the vehicle driver in a speaking mode, switch actuating means slideably received in the frame in closely spaced relation to the control switch of the microphone and foot pedal means connected to the switching actuating means for moving the actuating means into and out of contact with the said control switch.

2. The invention of claim 1 in which the microphone frame comprises a frame component and a spring clip secured at one side thereof for engagement with the microphone.

3. The invention of claim 2 in which the said frame component is constructed with a cable retaining slot.

4. The invention of claim 3 in which the microphone frame further includes an angularly formed arm having an outer extremity thereof recessed to provide an opening through which the actuating element is received.

5. Apparatus for supporting a Citizens Band transceiver microphone together with an externally located control switch in a position to be operated by the driver of a motor vehicle, said apparatus including a microphone holder frame in which the microphone may be detachably received with the control in an exposed position at one side thereof, support means for the microphone holder frame including an adjustable bracket structure engageable with the seat of the motor vehicle and a flexible tubular body having one end secured to the bracket structure and an opposite end attached to the microphone frame, elongated switch actuating means slideably disposed through the flexible tubing and having an actuator button fixed at one extremity thereof, said actuator button being movable into and out of contact with the exposed control switch in response to travel of the elongated actuating means, a foot pedal device connected to the actuating means, means for securing the foot pedal device to the floor of the vehicle and said foot pedal having an upright part responsive to foot pressure of a driver of the vehicle to advance and retract the actuator button.

6. The invention of claim 5 in which the said adjustable bracket structure includes a pair of spaced apart adjustable U-shaped elements and a connecting crosspiece.

7. The invention of claim 5 in which the foot pedal device includes a base, a slide element supported in the base and a foot pedal uprightly fixed to the slide.

* * * * *